Oct. 8, 1935.  G. H. RAREY  2,016,292
TURRET MOUNTING
Filed July 23, 1934

Inventor
George H. Rarey
By W. M. Roach
Attorney

Patented Oct. 8, 1935

2,016,292

UNITED STATES PATENT OFFICE 2,016,292

TURRET MOUNTING

George H. Rarey, United States Army, Fort Benning, Ga.

Application July 23, 1934, Serial No. 736,567

2 Claims. (Cl. 89—36)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a turret mounting especially adapted for armored vehicles.

The purpose of the invention is to provide a turret mounting which will have roller bearings on three sides, which will be sealed and protected against the entry of dust and bullet splash and which may be readily assembled and disassembled.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein.

Figure 1:
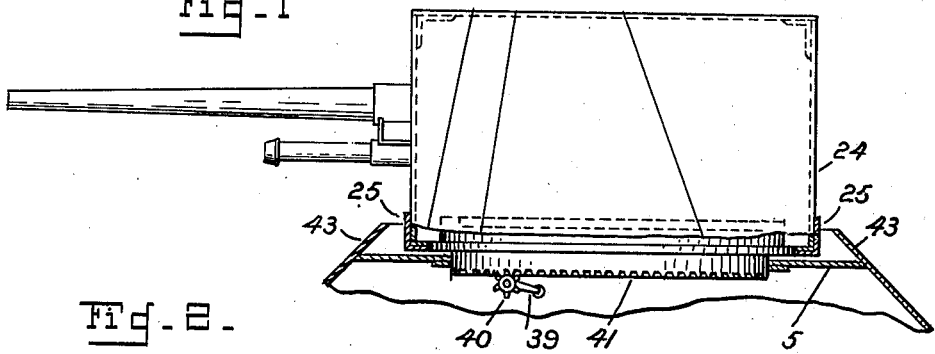
Fig. 1 is a side elevation parts in section of a turret constructed in accordance with the invention.
Figure 2:
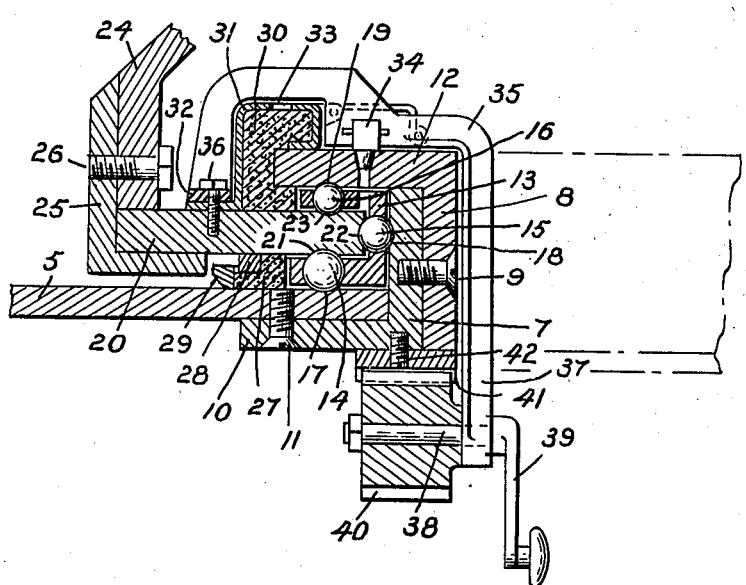
Fig. 2 is an enlarged sectional view of the bearing and showing the traversing mechanism.
Figure 3:
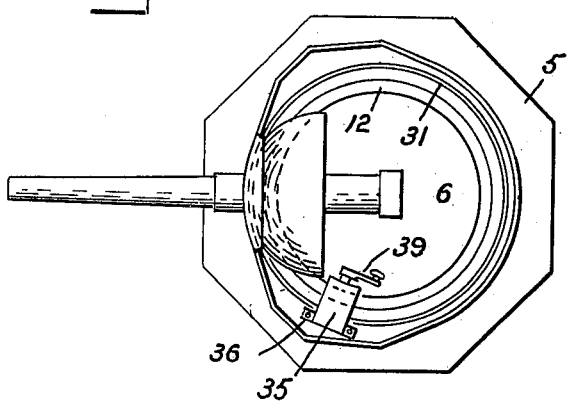
Fig. 3 is a plan view showing the traversing mechanism.

Referring to the drawing by characters of reference, there is shown a base or support 5 which constitutes part of the body of an armored vehicle. The base is formed with a circular opening 6 defined by a channel unit consisting of an outer ring 7 and an inner ring 8 secured to the outer ring by screws 9.

The outer ring includes a flange 10 underlying the margin of the base and secured thereto by screws 11. The inner ring includes a flange 12 overlying the margin of the base and spaced therefrom. The base 5, outer ring 7 and the flange 12 of the inner ring cooperate to form a channel for receiving a peripherally channeled race 13 whose three walls carry ball bearings 14, 15, and 16 respectively engaging in grooves 17, 18, and 19 in the base 5, outer ring 7 and flange 12.

The base ring 20 of a turret is spaced from the base 5 and has the three faces of its inner marginal portion formed with grooves 21, 22, and 23 respectively receiving the ball bearings 14, 15, and 16. For purposes of assembly, either the base ring 20 or the race 13 is formed in sections. The base ring 20 is secured to the side wall 24 of the turret by means of angled braces 25—25, disposed exteriorally of the turret and secured in place by screws 26.

A dust guard 27 of felt or similar material, encircles the lower portion of the race 13 and is disposed between the base 5 and base ring 20. It is confined by a pair of metal rings 28 and 29 which also protect both the guard 27 and the roller bearing unit from the splash from bullets striking the turret.

A felt dust guard 30 encircling the upper part of the race 13 and the flange 12 is confined by a cap ring 31 secured to the base ring 20 by screws 32. The cap ring is provided with apertures 33 for admitting oil to the felt guard. The flange 12 is provided with one or more fittings 34 for admitting lubricant to the roller bearings.

A bracket 35 secured to the base ring 20 by screws 36 bridges the flange 12 and has a depending arm 37 on the inside of the ring 8. A shaft 38 on the lower end of the arm 37 carries a crank 39 on one end and a gear wheel 40 on the other end. The gear wheel meshes with an annular rack 41 secured to the under side of the rings 7 and 8 by headless screws 42. The turret is turned on the roller bearings by acting on the crank 39.

In order to give further protection to the turret race, the inclined armored side plates 43 of the body of the vehicle are extended above the base 5.

I claim:

1. In a turret mounting, a base having an opening, an outer ring within the opening and having a flange secured to the under side of the base, an inner ring secured to the outer ring and having a flange spaced from the base, a peripherally channeled race between the base and the flange of the inner ring, roller bearings carried by the race and engaging the base, the outer ring and the flange of the inner ring, a turret positioned above the base and having a base ring with its marginal portion disposed in the race and engaging the roller bearings, and means for protecting the lower portion of the race from the bullet splash.

2. In a turret mounting, a base having an opening, an outer ring within the opening and having a flange secured to the under side of the base, an inner ring secured to the outer ring and having a flange spaced from the base, a peripherally channeled race between the base and the flange of the inner ring, roller bearings carried by the race and engaging the base, the outer ring and the flange of the inner ring, a turret positioned above the base and having a base ring with its marginal portion disposed in the race and engaging the roller bearings.

GEORGE H. RAREY.